Dec. 31, 1957 J. GAYNOR 2,817,992
RADIUS TURNING MECHANISM
Filed Oct. 4, 1955 4 Sheets-Sheet 1
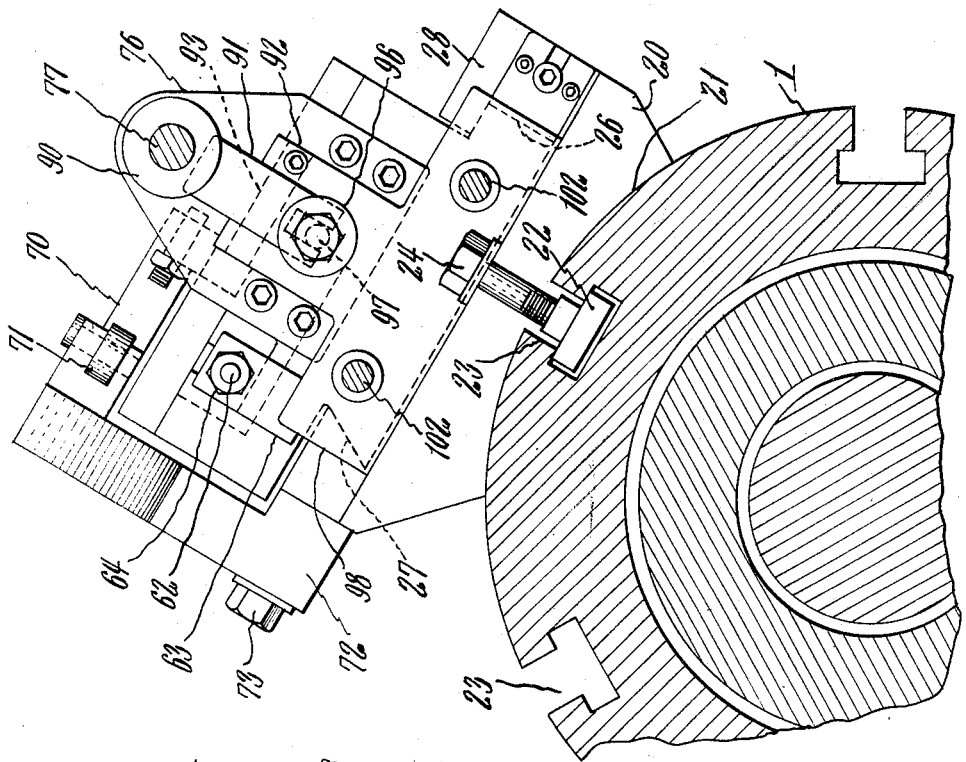
Inventor
John Gaynor
Wright Brown Quinby McCoy
Attys

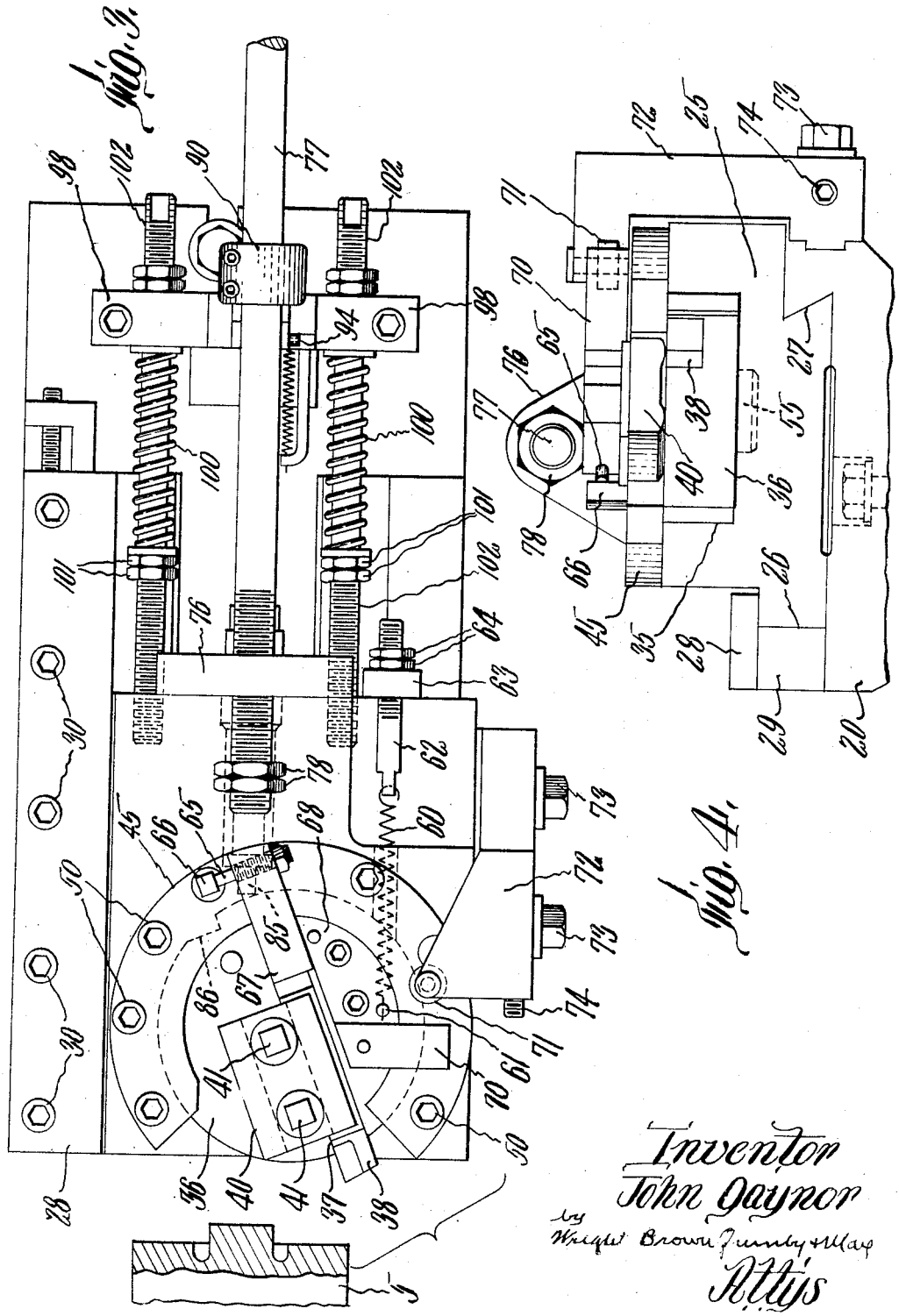

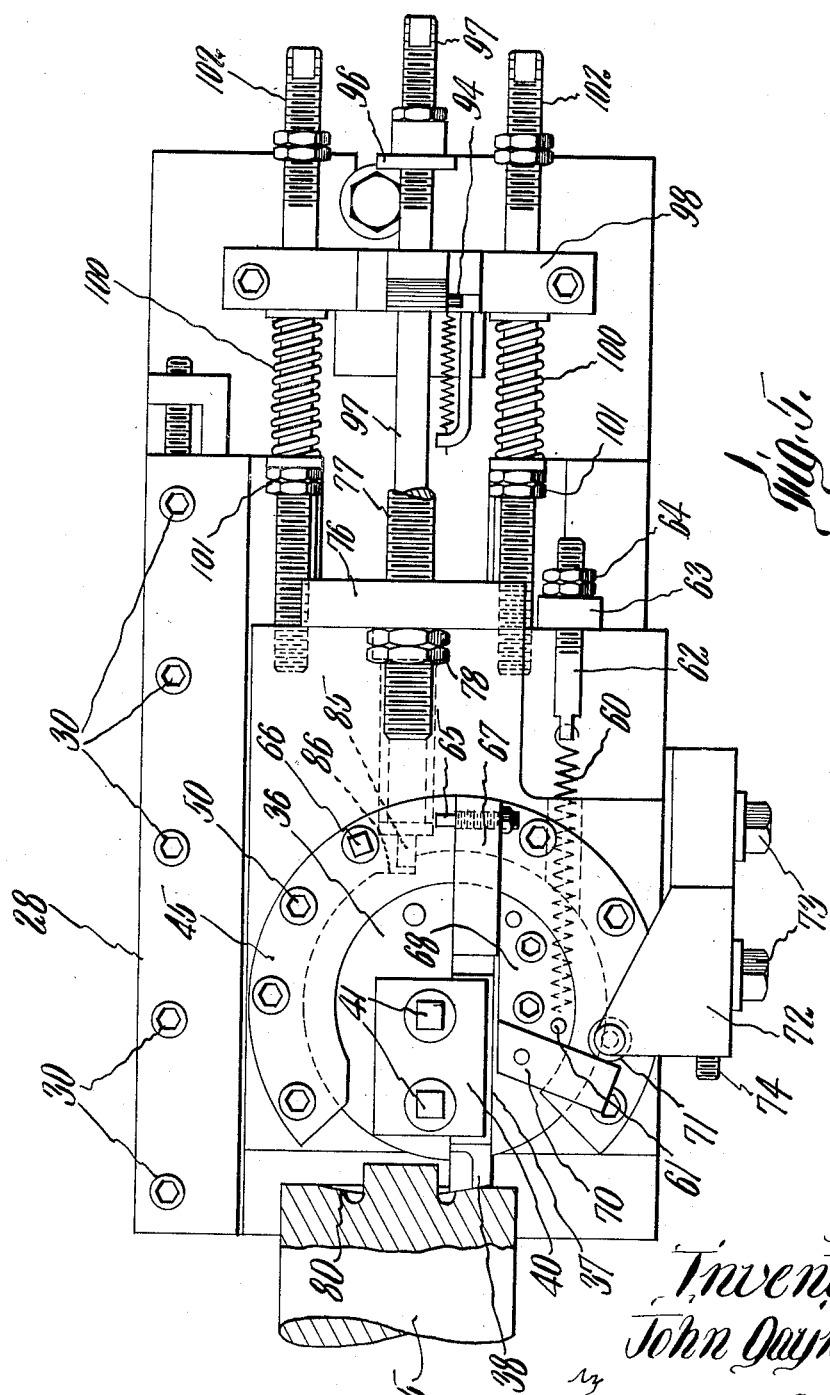

Dec. 31, 1957   J. GAYNOR   2,817,992
RADIUS TURNING MECHANISM
Filed Oct. 4, 1955   4 Sheets-Sheet 4
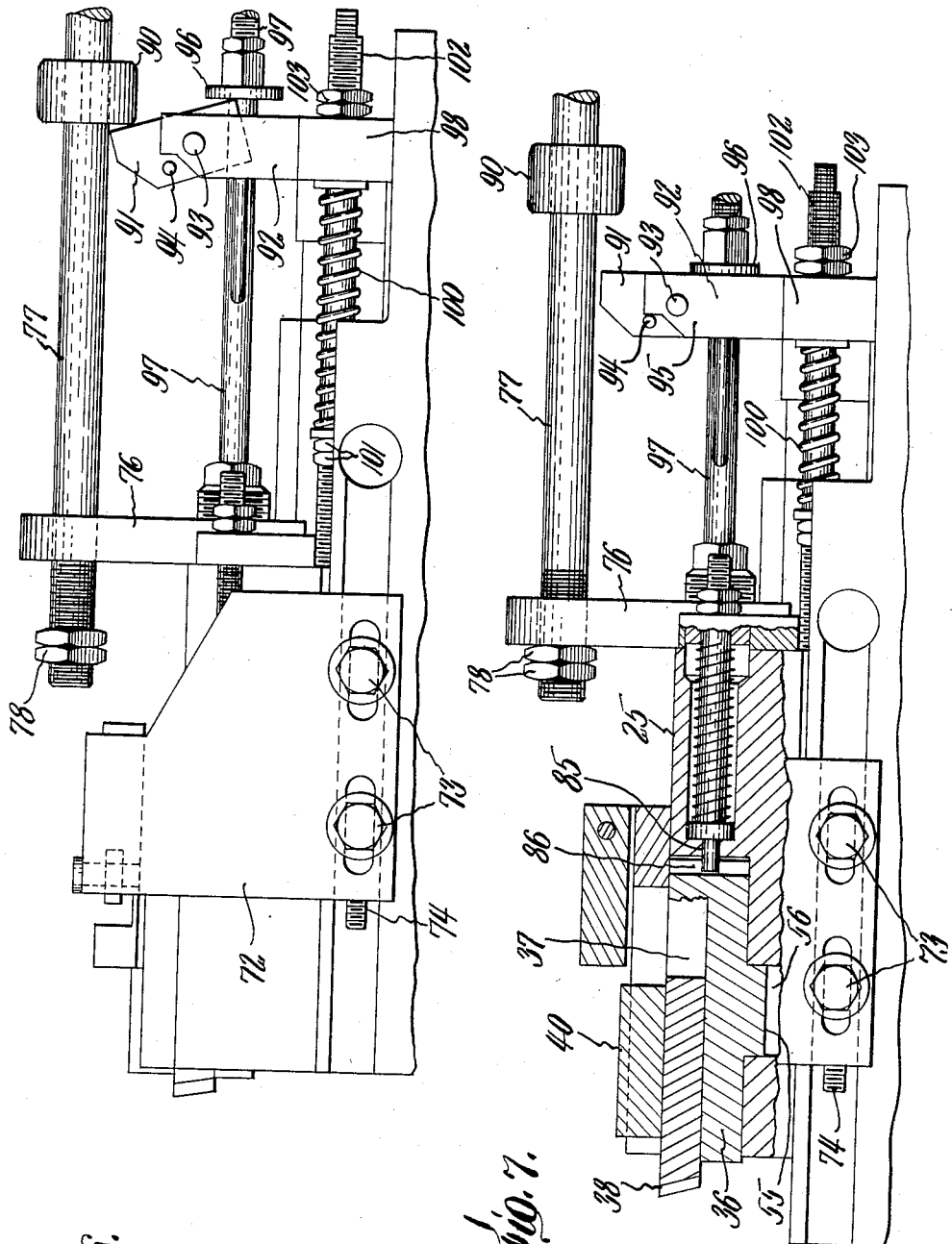
Inventor
John Gaynor
by Wright Brown Quinby & Way
Attys

United States Patent Office 2,817,992
Patented Dec. 31, 1957

2,817,992

RADIUS TURNING MECHANISM

John Gaynor, Windsor, Vt., assignor to Cone Automatic Machine Company Inc., Windsor, Vt., a corporation of Vermont Application October 4, 1955, Serial No. 538,416

1 Claim. (Cl. 82—24)

This invention relates to the machining of concave surfaces on work pieces which may be held in chucks, or on the ends of the bar stock held in rotary spindles, and has for an object to provide mechanism for so doing which will not leave tool marks on the concave surface. To this end the concaving tool is mounted on a mechanism which is moved toward the work with the concaving tool in starting position. When it has been so moved, the tool is fed from starting position to final position and is there latched, and the mechanism is then retracted, after which the tool is returned to the starting position with relation to carrying mechanism ready for the next operation.

For a complete understanding of this invention, reference may be had to the accompanying drawings in which Figure 1 is a fragmentary front elevation of a multiple spindle lathe in which the subject matter of this invention is shown embodied in an end working attachment, the tool being in initial position and the attachment retracted.

Figure 2 is a detail sectional view to a larger scale on line 2—2 of Figure 1.

Figure 3 is a plan view of the mechanism showing the tool in retracted position.

Figure 4 is a front elevation of the attachment.

Figure 5 is a view similar to Figure 3, but showing the attachment advanced and the tool having completed its cut ready for the retraction of the attachment.

Figure 6 is an elevational view at right angles to Figure 3, the attachment being retracted and the tool shown as about to be released to move back into starting position.

Figure 7 is a view similar to Figure 6, but with parts in section.

Referring first to Figures 1 and 2, the attachment mechanism is shown as applied to a tool carrier 1 which is slidably mounted on a shaft 2 which extends into a spindle carrier 3 in coaxial relation thereto, this spindle carrier having a plurality of work spindles 4 from each of which may project a work piece such as a chuck carried work piece or a piece of bar stock 5. The tool carrier 1 is mounted for sliding motion axially along the bar 2. As is shown in Figure 1, this is accomplished by the use of suitable cams on a cam drum 10 carried by an overhead cam shaft 11 which also carries various cams for actuating and controlling certain other parts of the machine in a manner well known in the art.

The tool carrier 1 is provided with a slide portion 12 extending upwardly therefrom and which has a cam follower 15 for cooperation with the cams on the drum 10 and by which the tool carrier 1 is moved axially in a predetermined cycle of operations.

The mechanism of this invention is secured to the outer face of the tool carrier 1. As shown best in Figure 2, this mechanism comprises a support 20 having a concave face 21 engageable with the outer convex face of the carrier 1 and which is held in fixed relation thereto as by means of T nuts 22 engaging in undercut grooves 23 arranged longitudinally in the tool carrier 1. These nuts may be engaged by the threaded shanks of bolts 24, the heads of which engage the outer face of the support 20. This support 20 has mounted thereon a slide 25. As shown best in Figure 4, this slide 25 has a perpendicular face 26 and an inclined face 27 which engage mating faces of the support 20. A cover strip 28 engages over the outer face of the slide 25 at one side and is secured to the spacer strip 29 as by the screws 30 to hold the slide 25 in position. This slide 25 has a circular recess in its outer face as at 35 within which is mounted a disk 36 provided with a transverse slot 37 within which is secured a tool 38. A cover plate 40 secured to the outer face of the disk 36, as by screws 41, may be employed to secure the tool 38 in proper position. The disk 36 is held in position as by an arcuate cover plate 45 which extends therefrom and which is secured to the top face of the slide 25 as by means of screws 50. The disk 36 has a central coaxial boss 55 (see Figure 7) which projects into a circular hole 56 in the slide 25.

A coil spring 60 secured at one end to a post 61 fixed to the disk 36 and at its outer end to a threaded rod 62 adjustably mounted in arm 63 and secured in adjusted position by check nuts 64, acts to hold the disk with the tool 38 in the angular position shown in Figure 3 for the start of a tooling operation, a stop member 65 threaded into the arm 67 then contacting with a suitable stop element 66 carried by the plate 45. Secured to the disk 36 is a member which consists of a plate portion 68, an arm 70, and the arm 67, the arm 70 overlying the cover plate 45 and which is in position to be engaged by a cam roller 71 on a bracket 72 which is adjustably secured to one face of the support 20 as by bolt and slot connections at 73. A screw 74 threaded in the member 72 and bearing on one of the bolts at 73 provides for adjustment of the bracket 72.

The slide 25 has an upward extending arm 76 at its rear end through which passes a rod 77 having a pair of check nuts 78 threaded on its forward end. The opposite end of the rod 77, as shown best in Figure 1, extends to and is fixed in a stationary portion 78 of the machine frame. As the tool carrier moves forward, the slide 25, together with its base, moves with it until the nuts 78 contact with the arm 76 and hold it against further forward movement. This stops the motion of the slide 25 while the motion of the support 20 continues. Further forward movement of the support 20 after this acts to press the cam roll 71 against the arm 70, as shown in Figure 5, and turns the disk 36, together with the tool, from the starting position shown in Figure 3 to the full cut position shown in Figure 5, where it has made the concave cut 80 in the work piece which projects from the spindle 3 in alinement therewith. The tool has now performed the desired cutting operation.

When the tool is turned to its final position, a spring latch 85 springs into a notch 86 in the disk 36, as shown in Figure 5, and holds the disk 36 in the finished cut position. When the tool carrier is thereafter retracted, it carries the attachment therewith with the tool latched in the position of Figure 5 and carries it away from the work piece. As it approaches its fully retracted position, a collar 90 on the rod 77 contacts with a spring latch member 91 pivoted on a bracket 92 at 93 and moves the member 91 away from the position of Figure 7 where a stop pin 94 thereon contacts with a bracket 95, this causing the latch member 91 to be tilted to the position shown in Figure 6 where it engages a collar 96 on the latch rod 97 and retracts the latch 85 from latching position and permits the spring 60 to return the disk 36 with the tool carried thereby to the starting angular position shown in Figure 3.

The slide 25 is urged into retracted position as by a pair of springs 100 reacting between nuts 101 on threaded rods 102 secured therein and stationary frame members 98 through which the rods 102 slide, nuts 103 thereon limiting the forward motion of these rods 102 and the slide 25.

From the foregoing description of an embodiment of this invention it should be evident to those skilled in the art that various changes and modifications may be made therein without departing from the spirit or scope of the invention.

I claim:

In combination with a rotary work spindle and supporting frame therefor, a tool carriage movable on said frame in a direction parallel to the axis of said spindle, a slide member carried by said carriage and movable relative thereto in a direction parallel to the movement of said carriage, a cutting tool, means operable to move said tool in an arc transverse to said spindle axis from a starting angular position, said means comprising a tool-holding member mounted on said slide to rotate about an axis transverse to the direction of motion of the slide, and cam means operable by relative movement of said slide and carriage to rotate said tool-holding member, means yieldingly holding said tool-holding member in said starting angular position, latch means carried by said slide for locking said tool-holding member in its angular position at the completion of a cutting stroke, a fixed stop element mounted on said frame, and means on said carriage engaging said stop when the carriage is retracted from the work spindle to trip said latch and unlock said tool-holding member for return to its starting position.

References Cited in the file of this patent

UNITED STATES PATENTS

| | | |
|---|---|---|
| 1,474,673 | Husted | Nov. 20, 1923 |
| 1,506,737 | Dressner | Sept. 2, 1924 |
| 1,678,924 | Strindberg | July 31, 1928 |
| 2,369,318 | Sirp | Feb. 13, 1945 |
| 2,521,619 | Weld | Sept. 5, 1950 |